United States Patent [19]

Hoer et al.

[11] 4,017,646
[45] Apr. 12, 1977

[54] PROCESS FOR PRODUCING PH MODIFIED PROTEIN FILAMENTS

[75] Inventors: Ralph A. Hoer, Ballwin, Mo.; Michael H. Stewart, Belleville, Ill.

[73] Assignee: Ralston Purina Company, St. Louis, Mo.

[22] Filed: Dec. 11, 1975

[21] Appl. No.: 639,721

[52] U.S. Cl. .............................. 426/656; 426/506; 426/802
[51] Int. Cl.² ........................................ A23J 3/00
[58] Field of Search ................... 426/506, 656, 802

[56] References Cited

UNITED STATES PATENTS

| | | | |
|---|---|---|---|
| 3,662,671 | 5/1972 | Frederiksen | 426/506 X |
| 3,662,672 | 5/1972 | Hoer | 426/656 |
| 3,800,053 | 3/1974 | Lange | 426/506 X |
| 3,821,453 | 6/1974 | Hoer | 426/506 |
| 3,928,641 | 12/1975 | Hoer | 426/506 |
| R28,091 | 7/1974 | Heusdens et al. | 426/506 X |

Primary Examiner—Joseph M. Golian
Attorney, Agent, or Firm—Virgil B. Hill; Veo Peoples, Jr.

[57] ABSTRACT

A process of continuously forming pH modified protein filaments from a proteinaceous material is disclosed wherein an aqueous slurry of the proteinaceous material is formed having a proteinaceous solids content of between about 0.5 and 35% by weight. Discrete filaments are formed by conducting the slurry under pressure through a heat exchange zone and heating the slurry to a temperature which is above 240° F. whereby the protein is subjected to such temperature for a sufficient period of time so that elongated filaments are thereafter separated from the remaining constituents of the slurry. The heated slurry is then continuously removed from said heat exchange zone through a back pressure creating orifice whereby discharge of said filaments from the heat exchange zone to a collecting zone is controlled by confining the stream of said filaments to within a total angle of between about 4° and 90°. A pH elevating material is then injected into the stream of filaments during confinement in order to modify the pH of the filaments to a pH of above about 6.0 and preferably between about 6.0 and 7.0. It has been determined that pH modified filaments produced in the above manner are highly functional for meat extender applications, yet pH modification in the above manner provides the maximum yield of protein filaments from a given weight of proteinaceous slurry since the pH of the slurry is not altered prior to filament formation.

17 Claims, 2 Drawing Figures

PROCESS FOR PRODUCING PH MODIFIED PROTEIN FILAMENTS

BACKGROUND OF THE INVENTION

Food scientists have long been interested in using a wide variety of protein sources to produce food products which resemble meat. Among the most sought for alternatives have been processes for converting protein sources such as oilseed flours, meals, cereal proteins and microbial proteins to more acceptable protein food products particularly those which resemble meat in texture. This impetus has resulted in the development of a wide variety of techniques to produce textured protein food products resembling meat. The most common technique has been the wet spinning process as disclosed in U.S. Pat. No. 2,730,447 to R. A. Boyer. The wet spinning process generally produces protein fibers by extruding a plurality of fine streams of an aqueous solution of protein into an acid chemical coagulating bath. The protein coagulates into fine fibers which are then collected and treated to form an edible textured protein product. Other methods of producing textured protein products resembling meat have included a shred-like protein product formed by heat coagulation of undenatured protein as disclosed in U.S. Pat. No. 3,047,395 to Rusoff et al.

Since development of these early processes for forming textured protein products from a variety of edible protein sources, expanded textured products have been produced by the extrusion of a proteinaceous source through an environment of elevated pressure and temperature into an environment of substantially lower pressure with resultant puffing and expansion of the product. The expanded product has textural characteristics upon rehydration with water which is very similar to a real piece of meat. Extrusion techniques for the production of expanded protein products, especially those derived from oilseed meals are described In U.S. Pat. Nos. 3,488,770 and 3,496,858.

More recently a process for the production of protein filaments from a wide variety of protein sources has been disclosed and provides a method for producing edible protein filaments without a requirement for special equipment, thereby avoiding a large capital expenditure in order to commercialize the process. The noted process has generally involved heating a slurry of proteinaceous material by conducting the slurry through a heat exchanger at a proteinaceous solids level of between about 0.5 and 35% by weight under pressure and heating the slurry in a heat exchanger for sufficient period of time so that elongated filaments are separated from the slurry. The heated slurry is thereafter continuously removed from the heat exchange zone through a back pressure creating orifice whereby discrete elongated filaments are discharged into the collecting zone. The protein filaments which are formed are highly useful in making a wide variety of food products, and may be conveniently incorporated with conventional meat sources to form food products having improved aesthetic appeal, flavor and economy. Processes of the above type which may be included to form these unique, elongated protein filaments include those described in U.S. Pat. Nos. 3,662,671, 3,662,672, 3,821,453 and Re. 28,091 all of which are incorporated herein by reference. These processes have provided an effective solution to the attendant problems associated with prior art processes for the production of textured protein food product from a variety of protein sources. The present invention is specifically intended to comprise an improvement over the processes disclosed in the above identified patents since it has been determined that for certain food applications, specifically those involving addition of the protein filaments to a meat source, it is preferable for the filaments to have a pH above about 6.0 and preferably between about 6.0 and 7.0 since a protein filament having a pH in this range possesses better cooking properties in the meat product as compared to filaments which have a lower pH in the vicinity of 4.5 to 5.5. A higher pH for the protein filaments can obviously be achieved by adjusting the pH of the slurry prior to filament formation to the desired range of about 6.0 and while filaments obtained in this manner are satisfactory, it has been determined that the yield of protein filaments from a given weight of the proteinaceous slurry if the pH is adjusted in this manner is somewhat lower than would be desirable for a commercial process depending on the process conditions employed. Therefore, a need has been created for a more efficient process for the production of a pH modified protein filament having a pH above about 6.0 or within the range of 6.0 to 7.0 without decreasing the yield of the proteinaceous filaments or altering the desirable functional properties thereof. U.S. Pat. No. 3,928,641 herein incorporated by reference describes a method of collecting protein filaments of the above type in which discharge of the filaments from a heat exchange zone into the collecting zone is controlled by confining the stream of filaments exiting the orifice to within a critically defined total angle of between about 4° and 90°, said angle being measured in relationship to a theoretical axis through the central portion of the nozzle or back pressure creating orifice. Confinement of the stream of filaments in this manner prevents lumping at the periphery of the collecting zone by fine filaments which can be created by atomization of the slurry. These undesirable lumps of fine filaments can be discharged into the collecting zone and into the final product. The discharge of these filaments is controlled by the use of a shield placed over the nozzle with a conically shaped diverging section having a total angle of between about 4° and 90°. This shield section provides a means of confining the ejected slurry until the filaments are sufficiently cooled that no accumulation of any fine filaments results.

It is, therefore, an object of the present invention to provide a process for the pH modification of protein filaments.

It is a further object of the present invention to provide a process for the pH modification of protein filaments wherein the maximum yield of protein filaments from a given weight of proteinaceous slurry is achieved.

It is also an object of the present invention to provide a process for the pH modification of protein filaments wherein said modified filaments are especially suitable for addition to meat products as an extender.

SUMMARY OF THE INVENTION

The present invention is specifically intended to comprise an improvement over the general process for the production of protein filaments since it has been determined that a pH modification of the protein filaments to above about 6.0 or within the preferred range of 6.0 to 7.0 provides maximum functionality for these filaments as an extender in various types of meat products. On the other hand, it has also been determined that if the pH of the slurry prior to filament formation is adjusted to within this range, the yield of protein filaments from a given weight proteinaceous slurry is somewhat lower than would be economically desirable for a commercial process even though the pH of the filaments might be successfully modified. Furthermore, if one attempts to modify the pH of the protein filaments after cooling and collection thereof, the pH of the filaments cannot be uniformly controlled and there is a tendency for the filaments to be broken up by the mixing required to give the filaments uniform pH value. Therefore, it would be desirable to modify the pH of these protein filaments without decreasing the yield of protein filaments of altering any desirable functional properties thereof.

The present invention provides a solution to this problem by adding an alkaline or pH elevating material to modify the protein filaments wherein said material is injected into the process used for the production of the protein filaments after formation of the filaments during confinement by the discharge shield in order to produce pH modified filaments having a pH above about 6 and preferably between about 6.0 and 7.0. It has been determined that pH modified filaments produced in this manner are entirely functional yet the maximum yield of protein filaments from a given weight of proteinaceous slurry is obtained since the pH is not altered substantially prior to filament formation and the slurry prior to filament formation may be controlled at a pH range that gives the maximum yield of proteinaceous filaments.

Confinement of the stream of filaments exiting the back pressure creating orifice or nozzle into the collecting zone is achieved by employing a discharge shield with a conical diverging section adapted to the back pressure creating orifice in order to confine the stream of filaments exiting the orifice to within a critically defined total angle of between about 4° and 90°, said angle being measured in relationship to an axis through the central part of the nozzle or back pressure creating orifice. The shield which is provided to control discharge of the filaments into the collecting zone has an additional advantage in the instant process in that it provides a suitable mixing chamber for injection of the alkali or pH elevating material which is used to modify the pH of the filaments to within the noted range of 6.0 to 7.0. The shield with the conical diverging section which is adapted to the back pressure creating orifice provides a mixing chamber because of violent turbulence created at this point by confinement of the pressurized stream of protein filaments and unreacted constituents of the slurry for a brief period of time. Therefore, if the alkali or pH elevating material is injected into the mixture at the back pressure creating orifice while the filaments are still confined within this shield, the best possible mixing of alkali and fiber takes place to provide the most uniform and consistent pH modification of the filaments. This also provides the most efficient means of modifying the pH of the protein filaments since the yield of filaments is not reduced and filament formation may be carried out at an optimum pH level.

DESCRIPTION OF THE PREFERRED EMBODIMENTS

Figure 1:
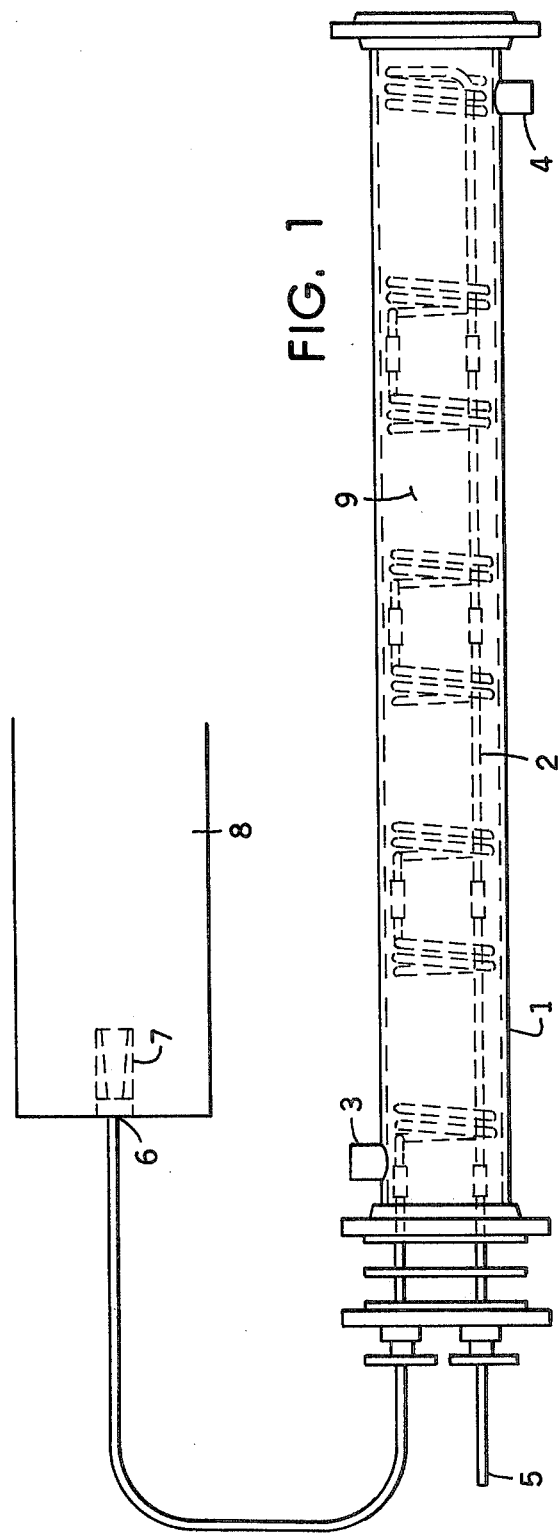
FIG. 1 represents a typical heat exchanger apparatus employed in the instant process for the production of protein filaments.

As previously discussed, the present invention involves heating of the slurry of a proteinaceous material by conducting the slurry through the heat exchanger under high pressure. The slurry preferably will have a proteinaceous solids content of between about 0.5 –35% by weight and preferably 20–35% by weight with an upper limit insofar as solids content being primarily dependent on the mechanical limitations of the pump which is employed. The proteinaceous material which may be used to produce the protein filaments pursuant to the process of this invention includes vegetable protein materials such as soy or other oilseed protein materials, e.g. oilseed meals, concentrates or isolates although other oilseed materials such as sesame, cottonseed, peanut and the like may be employed. It is further desirable to employ animal protein sources such as albumen and casein or microbial protien from sources such as brewer's or torula yeast depending upon the functional characteristics of the product desired. It is preferred in the process of the present invention that the pH of the slurry used for filament formation be below about 6.0 and preferably near the isoelectric point of the protein employed to provide the best yield of protein filaments. Obviously, a different pH is suitable if one is willing to tolerate a somewhat lower yield. In the case of soy protein, a preferred pH for the slurry is between about 4.5 and 5.0. Following formation of the aqueous, proteinaceous slurry, it is conducted through a heat exchanger under pressure and heated for a sufficient period of time so that elongated, discrete protein filaments can be separated from the remaining constituents of the slurry. The heated slurry is thereafter conducted through a back pressure creating orifice which may have a single or plurality of adjacent openings therein. The filaments are usually immediately contacted in the collecting zone with the cooling medium such as air or water which is effective to cool the protein filaments to prevent adhesion thereof. Typically, in a commercial operation, a discharge shield having a conical diverging section is adapted to the back pressure creating orifice, said section having a total angle of between about 4° and 90°, said angle being measured from a theoretical axis through the center of the back pressure creating orifice. The shield controls discharge of the filaments into the collecting zone and prevents lumping or agglomeration of very fine filaments which sometimes occurs at the periphery of the collection zone.

The noted reaction for the formation of the discrete protein filaments takes place as a function of time, temperature and pressure with temperatures between about 240° and 315° F. being preferred, especially for soy protein, although higher temperatures are equally suitable provided that the protein material is not degraded or adversely affected in any manner. The process may degraded or adversely affected in any manner. The process may also be operated over a wide pressure range and pressures above about 50 psig are quite satisfactory in order to produce the protein filaments with preferred pressures being between about 50 and 5,000 psig. The back pressure creating orifice placed between the heat exchange zone and the collecting zone provides pressure on the system and is generally intended to control the shape of the product. In general, circular orifices having the shape of the product. In general, circular orifices having either single or multiple openings with a diameter of between about 0.015 and 0.030 inches are quite satisfactory.

As previously noted, it is desirable in some food applications to employ a protein filament having a pH above about 6 and preferably between about 6.0 nd 7.0. While this can be satisfactorily achieved with the present process by adjusting the pH of the proteinaceous slurry prior to protein filament formation; nevertheless, the yield of protein filaments is somewhat less than can be economically tolerated in a commercial process thereby minimizing the usefulness of pH adjustment in this manner. Similarly, the protein filament can be formed at a pH near the isoelectric point of the protein where the maximum yield of protein filament takes place with the pH of the filaments being raised after cooling and collection thereof. This procedure, however, also has some disadvantages. For example, spraying of the cooled filaments with alkali or a pH elevating material requires mixing of the filaments in order to uniformly adjust the pH thereby breaking up the filaments into small pieces. It has, therefore, been determined that a pH modified protein filament having a pH above about 6 and preferably between about 6.0 and 7.0 can be produced without a reduction in yield or functional properties by the injection of an alkaline or pH elevating material into the mixture of the slurry and formed protein filaments in the discharged shield adapted to the back pressure creating orifice. It is at this point that injection of alkali provides the maximum amount of mixing and most uniform pH modification of the protein filaments.

Referring now to FIG. 1, which is intended to provide a more complete understanding of the total process of the present invention and the relationship of this specific improvement thereto, a typical heat exchanger apparatus employed in the production of the edible protein filaments is shown. The heat exchanger illustrated at FIG. 1 is a relatively simple piece of apparatus having a shell 1 with an inner chamber 9. Steam flows through the inner chamber through the entrance opening 3 and exits the chamber of the heat exchanger through exit port 4. Tubular section 2 represents typical tubing of a heat exchanger and can comprise any type of metal desired although stainless steel is preferably. The exact size of the tubing is not intended to limit the present invention and any standard heat exhanger tubing may be employed having an outside diameter of between ¼ inch and 1½ inches. For the present invention, it is preferred that the tubular section have an outside diameter of about ⅜ inch. The length of the tubular section is also not critical to the practice of the present invention. As represented by FIG. 1, the tubing may be compressed into a number of coils within the shell of the heat exchanger to provide both straight and/or coiled sections of tubing. A typical and preferred length of the tubular section 2 of the heat exchanger apparatus of the present invention is between about 20 and 170 feet. The proteinaceous slurry is pumped into the heat exchanger at entrance point 5 and cycles through the tubular section 2 under pressure during which the temperature is elevated by the steam in chamber 9. A restricted or back pressure creating orifice 6 having single or multiple openings is provided which exits into collection zone 8. It is preferred that an orifice be employed which has a plurality of openings since this provides a means of increasing the filament production capacity of the system. A typical back pressure creating orifice as employed in the present invention comprises a stainless steel nozzle having between about 9 and 25 openings, each with a diameter of between about 0.015 and 0.030 inches.

The back pressure creating orifice 6 is fitted with a discharge shield 7 having a conical diverging section with a critically defined total angle of between about 4° and 90°, said angle being measured from a theoretical axis through the center of the nozzle or orifice. This critically defined angle provides a means of controlling discharge of the filaments and insuring smooth flow of the filaments into the collecting zone thereby preventing random discharge of the filaments at a sharp angle in relationship to the orifice openings and creating lumping or aggregation of these filaments at the extremities of the collection zone.

Figure 2:
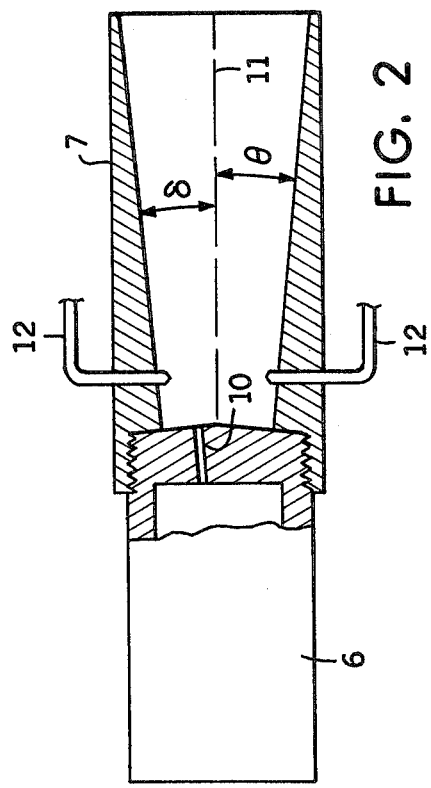
FIG. 2 represents a detailed view of the back pressure creating orifice of the heat exchanger apparatus of the present invention, together with the discharge shield over the orifice having a conical divergent section with the noted critically defined angle illustrating the point of injection of the alkali or pH modifying agent in order to modify the protein filaments pursuant to the process of the present invention.

With specific reference to FIG. 2, the discharge shield 7 and back pressure creating orifice 6 are more fully described, as well as the relationship of the present invention to this specific portion of the apparatus. The nozzle or back pressure creating orifice 6 has an opening 10, which is preferably disposed at some angle in relationship to the theoretical axis through the center of the nozzle or back pressure creating orifice 6. The exact spray angle of this opening is not critical to the practice of the present invention and, in fact, the surface of nozzle 6 can be completely flat if desired. A preferred spray angle front for the nozzle openings of the back pressure creating orifice as is illustrated by nozzle opening 10, is about 5°. With reference to FIG. 2, which shows only a single nozzle opening 10 for the purposes of illustration, a theoretical axis 11 is provided through the center of the nozzle or back pressure creating orifice 6 to provide a suitable reference point for the angle referred to in the description of the instant invention. The spray angle or angle of discharge of the slurry through opening 10 is preferably at about 5° as measured in relationship to axis 11.

Discharge shield 7 provides a means for confinement of the stream of the slurry to within a critically defined total angle of between about 4° and 90°, wherein the critical angle is measured in relationship to theoretical axis 11, and comprises the total of angle $\delta$ and angle $\theta$. These angles are represented in FIG. 2 for the purposes of illustration. It is further preferred that the conical diverging section of the discharge shield have a total angle ($\delta + \theta$) which is at least equal to or greater than the spray angle or angle of discharge of the slurry from the nozzle. The angle of discharge or spray angle is, of course, measured as the angle between a theoretical axis through nozzle opening 10 and theoretical axis 11 through the center of the back pressure creating orifice.

It is further preferred that discharge shield 7 have a conical diverging section with a length of at least about 1 inch and most preferably about 3–12 inches. The length of the conical diverging section for the purposes of the instant invention is not deemed to be critical and any length may be employed. A cyclindrical extension pipe can also be added to the discharge shield 7 to promote mixing if desired, although this is unnecessary insofar as uniform modification of the pH of the protein filaments to within the desired range of 6.0 to 7.0. The diameter of the discharge shield 7 at the outer end is also not at all critical to the practice of the instant invention and can be of any size.

pH modification of the protein filaments is achieved by injection of an alkali or pH elevating material at injection port 12 wherein the mixture exiting the orifice into the collecting zone, which comprises formed proteinaceous filaments and unreacted constituents of the slurry, is still in a state of agitation in the chamber because of the pressurized stream of filaments and slurry exiting the orifice. Injection of the alkaline material at this point in order to modify the pH of the collected filaments to above about 6.0 provides the most uniform mixing of the alkaline material with the filaments in order to provide a consistent, pH modified product. Uniform modification is believed to be achieved because of the extensive mixing that occurs in the chamber because of confinement of the ejected slurry by the discharge shield or conical diverging section for a short period of time.

Alkaline material which may be used to modify the pH of the filaments to above about 6.0 and preferably between about 6.0 and 7.0 may be selected from a variety of pH elevating materials including alkali hydroxides, alkaline earth hydroxides and various pH elevating salts, as well as mixtures of these materials and the exact material which may be employed is not critical to the practice of the instant invention provided that it sufficiently elevates the pH of the protein filament to within the noted range. A pH elevating material which is preferred in the instant invention is sodium carbonate and typically aqueous solutions of sodium carbonate are injected through injection port 12 into the discharge shield of the apparatus described in FIG. 2. Typically, these aqueous solutions have a concentration of sodium carbonate of between about 8 and 13% by weight. The actual concentration of the alkaline or pH elevating material is not, however, deemed to be critical for the purposes of the instant invention, and the exact concentration employed will be entirely dependent upon the limitations of the pump as well as the pump rate of the solution used for injection of the alkaline material at injection port 12.

It is also preferred, although not critical to the practice of the instant invention, that the alkali or pH elevating material be heated, since somewhat better mixing occurs between the protein filaments and the alkali or pH elevating material added if the alkali is heated to an elevated temperature preferably of about 250° F. The actual temperature of the alkali is not critical to the practice of the instant invention.

It is further not critical to the practice of the present invention as to the exact pH to which the filaments are adjusted to by injection of the alkali pursuant to the process disclosed herein, provided that the pH is above about 6.0, preferably between 6.0 and 7.0 with a most preferred range being between 6.2 and 6.4 if the filaments are to be used with red meat or between 6.6 and 6.8 if they are to be used with a fish material. Therefore, pH modification by injection of the alkali at this point of the process provides uniform pH modification as well as maximum yield of filaments since the pH of the slurry before filament formation may be controlled to that range at which the maximum yield of protein filaments takes place.

As previously noted, the pH modified filaments produced pursuant to the process of the present invention are highly functional in certain applications, principally for addition to certain meat products. Pursuant to a better understanding of the instant invention, the following Example is set forth disclosing specific but non-limiting embodiments of the present invention.

EXAMPLE 1

A proteinaceous slurry comprising 974 pounds of isolated soy protein with a solids content of 24.0% by weight was mixed with 26 pounds of coconut oil and the pH of the slurry adjusted to 4.7 using a 50% solution of sodium hydroxide. The proteinaceous slurry was ground in a colloid mill. This slurry was pumped through a heat exchanger made of 80 feet of ⅝ inch OD stainless steel tubing in a 6 inch pipe. The temperature of the heat exchanger was set at 305° F. and the slurry was expelled through a back pressure orifice plate containing 15 holes, each hole being 0.019 inches in diameter. A discharge shield having a total angle of 10° and a length of 3 inches was placed over the orifice plate which additionally included four holes 0.019 inches in diameter, each located 90° apart around the discharge shield for injection of a pH elevating solution. A pH elevating solution comprising a 13% aqueous solution of sodium carbonate heated to a temperature of 250° F. was injected into the discharge shield. The rate of addition of aqueous sodium carbonate was adjusted to give a pH value for the fiber of about 6.4. The fibers collected were determined to have a pH of about 6.4 and were of acceptable texture.

The above Example is merely illustrative of the instant invention and it would be understood that various other changes in the details, materials, or steps which have been described may be made without departing from the spirit of the instant disclosure, and such changes and other modifications are intended to be included within the scope of the instant disclosure and appended claims.

What is claimed is:

1. In a method of continuously forming discrete, elongated protein filaments from proteinaceous material wherein an aqueous slurry of the proteinaceous material is formed having a pH below about 6.0 and a proteinaceous solids content of between about 0.5 and 35% by weight, the discrete, elongated filaments being formed by continuously conducting the slurry under pressure through a heat exchange zone and in said zone heating the slurry to a temperature which is above 240° F. but which is less than that which will degrade the protein, whereby the protein is subjected to such temperature for a sufficient period of time so that elongated, tender filaments are thereafter separated from the remaining constituents of the slurry and the heated slurry is continuously removed from said zone through a back pressure creating orifice whereby the discharge of said filaments from the heat exchange zone to a collecting zone is controlled by confining the stream of said filaments being discharged from said orifice into collecting zone to within a total angle of between about 4° and 90°, said angle being measured from an axis through the center of said orifice, followed by separation of said discrete filaments in the collecting zone from the remaining constituents of the slurry, the improvement comprising; injecting a pH elevating material into the stream of filaments during confinement in order to modify the pH of the filaments to above about 6.0.

2. A process as set forth in claim 1 wherein the pH of said filaments is modified to between about 6.0 and 7.0.

3. A process as set forth in claim 2 wherein the pH of said filaments is modified to between about 6.2 and 6.4.

4. A process as set forth in claim 2 wherein the pH of said filaments is modified to between about 6.6 and 6.8.

5. A process as set forth in claim 1 wherein the pH elevating material is an aqueous solution of sodium carbonate.

6. A process as set forth in claim 5 wherein the aqueous solution of sodium carbonate is heated.

7. The method of claim 1 wherein the slurry is heated in the heat exchange zone to a temperature of above about 240° F.

8. The method of claim 1 wherein the slurry is heated in the heat exchange zone to a temperature of between about 240° and 315° F.

9. The method of claim 1 wherein the pressure to which the slurry is subjected in the heat exchange zone is between about 50 and 5,000 psig.

10. A process as set forth in claim 1 wherein the stream of said filaments is confined within a total angle of about 12°.

11. A process as set forth in claim 1 wherein the total angle is at least equal to or greater than the angle of discharge of said slurry from said orifice into the collecting zone.

12. A process as set forth in claim 1 wherein said stream of filaments is confined by a discharge shield placed over said orifice, said shield having a conical diverging section with a total angle of between about 4° and 90°, said angle being measured in relationship to an axis through the center of said orifice.

13. The process as set forth in claim 12 wherein said shield has a length of at least about 1 inch.

14. In a method of continuously forming discrete, elongated protein filaments from a soy protein material wherein an aqueous slurry of the soy protein material is formed having a pH of between about 4.5 and 5.0 with a proteinaceous solids content of between about 0.5 and 35% by weight, the discrete, elongated filaments being formed by continuously conducting the slurry under pressure through a heat exhange zone and in said zone heating the slurry to a temperature which is between about 240° and 315° F., whereby the protein is subjected to such temperature for a sufficient period of time so that elongated, tender filaments are thereafter separated from the remaining constituents of the slurry and the heated slurry is continuously removed from said zone through a back pressure creating orifice whereby the discharge of said filaments from the heat exchange zone to a collecting zone is controlled by confining the stream of said filaments being discharged from said orifice into the collecting zone to within a total angle of between about 4° and 90°, said angle being measured from an axis through the center of said orifice, followed by separation of said discrete filaments in the collecting zone from the remaining constituents of the slurry, the improvement comprising; injecting a pH elevating material into the stream of filaments during confinement in order to modify the pH of the filaments to above about 6.0.

15. A process as set forth in claim 14 wherein the pH of said filaments is modified to between about 6.0 and 7.0.

16. A process as set forth in claim 15 wherein the pH of said filaments is modified to between about 6.2 and 6.4.

17. A process as set forth in claim 14 wherein the pH of said filaments is modified to between about 6.6 and 6.8.

* * * * *

UNITED STATES PATENT AND TRADEMARK OFFICE
CERTIFICATE OF CORRECTION

PATENT NO. : 4,017,646
DATED : April 12, 1977
INVENTOR(S) : Ralph A. Hoer et al

It is certified that error appears in the above-identified patent and that said Letters Patent are hereby corrected as shown below:

Column 3, line 3, insert "of" between "weight" and "proteinaceous"

Column 4, line 28, "protein" should be inserted for "protien".

Column 4, lines 66 through 68, omit "The process may degraded or adversely affected in any manner."

Column 5, lines 8 & 9, omit "In general, circular orifices having the shape of the product."

Column 5, line 14, "nd" should read "and".

Column 5, line 36, "discharged" should read "discharge"

Column 5, lines 53 & 54, "preferably" should read "preferred".

Column 5, line 56, "hanger" should read "changer".

Column 7, line 24, "material" should read "materials".

Signed and Sealed this

Twenty-first Day of February 1978

[SEAL]

Attest:

RUTH C. MASON
Attesting Officer

LUTRELLE F. PARKER
Acting Commissioner of Patents and Trademarks